United States Patent [19]
Walker

[11] Patent Number: 5,617,239
[45] Date of Patent: Apr. 1, 1997

[54] OPTICAL SOURCE FOR COMMUNICATIONS SYSTEM

[75] Inventor: Nigel G. Walker, Ipswich, England

[73] Assignee: British Telecommunications public limited comany, London, England

[21] Appl. No.: 360,829

[22] PCT Filed: Jun. 29, 1993

[86] PCT No.: PCT/GB93/01353
§ 371 Date: Jan. 17, 1995
§ 102(e) Date: Jan. 17, 1995

[87] PCT Pub. No.: WO94/00928
PCT Pub. Date: Jan. 6, 1994

[30] Foreign Application Priority Data

Jun. 29, 1992 [EP] European Pat. Off. ............. 92305964
Aug. 5, 1992 [EP] European Pat. Off. ............. 92307150
Sep. 4, 1992 [EP] European Pat. Off. ................ 9218742

[51] Int. Cl.$^6$ .................... H04B 10/04; H04B 10/12
[52] U.S. Cl. .................. 359/181; 359/188; 359/182; 359/183
[58] Field of Search ................... 359/180, 183, 359/181, 182, 188, 191

[56] References Cited

U.S. PATENT DOCUMENTS

3,435,229  3/1969  Buhrer ................................. 359/181
4,897,883  1/1990  Harrington ........................... 359/176

FOREIGN PATENT DOCUMENTS

0025491  3/1981  European Pat. Off. .

*Primary Examiner*—Leslie Pascal
*Attorney, Agent, or Firm*—Nixon & Vanderhye P.C.

[57] ABSTRACT

An optical source for a communications system includes an optical signal source whose output is modulated to contain sidebands. The sidebands interact to produce beat frequencies and modifying apparatus, such as a length of dispersive optical fibre, is used to modify characteristics of the sidebands so that the beat frequency can be detected at a receiver such as a photodetector. In this way, high frequency signals can be generated and photodetected, the output of the receiver being suitable to drive a microwave antenna, thus providing an optically fed microwave communications link. Using a video signal generator a video signal can be superimposed on the received beat frequency and therefore carried by the microwave link.

20 Claims, 4 Drawing Sheets

OPTICAL SOURCE FOR COMMUNICATIONS SYSTEM

BACKGROUND OF THE INVENTION

1. Field of the Invention

The present invention relates to an optical source for a communications system and finds particular application in supplying high frequency signals to a photodetector.

2. Related Art

It is known to use a semiconductor laser structure as a signal source in optical communications. Such structures usually comprise an active layer of semiconductor material into which electrical carriers are injected by applying a drive current. The active layer is provided with optical confinement and feedback. The injected carriers produce photons in the active layer which oscillate and multiply by laser action to produce an optical output, often from an end facet of the laser structure.

It is known that, in distributed feedback (DFB) lasers, it is possible to superimpose modulation on the optical output of a laser by varying the drive current. Because of physical limitations of the devices, this has only been done at rates up to about 20 GHz. It is also known that as the drive current power increases, optical sidebands are seen, separated by the optical modulation frequency. As the optical frequency deviation of the source increases, more sidebands are produced, reflecting an overall spectral spreading of the modulated source.

On a photodetector a received electrical signal is produced which is given by the (phasor) sum of the beat signals generated between all pairs of optical sidebands. The received electrical signal therefore contains components at multiple harmonics of the modulating frequency. However, a frequency modulated (FM) or phase modulated (PM) optical signal results in an electrical signal containing only a D.C. (zero frequency) component: the summation of beat signals between sidebands exactly cancels to give zero for the electrical signal components at the modulation frequency and higher harmonics thereof. Hence, although high frequency beat signals are present, they do not manifest themselves at a conventional photodetector based receiver. In the paper entitled "35 GHz Microwave Signal Generation with an Injection-locked Laser Diode", published in Electronics Letters 29th Aug. 1985 vol 21 no. 18, L Goldberg et al describe a system for generating 35 GHz signals by injection locking a slave laser to sidebands of a modulated master laser output. Using a slave laser which has free-running modes separated by a frequency difference which equals a selected beat frequency between sidebands of the master laser, an output is generated from the slave laser which comprises two relatively high amplitude signals separated by that same beat frequency. At a receiver, the beat frequency appears. However, two laser devices are required and it can be difficult to achieve a workable arrangement, it being necessary to provide close wavelength control. It is also difficult to achieve requisite modes in the slave laser, spacing of modes being limited by the length of the device.

SUMMARY OF THE INVENTION

An object of the present invention is to provide a practical optical source for communications systems which can be used to generate high modulation rate signals which can be detected by a photodetector.

Embodiments of the present invention can be used to generate photo-detectable signals at microwave frequencies, for instance up to of the order of 60 GHz or greater.

Further, it has been found that these detectable signals can be modulated to carry information, such as video signals and, using a photoelectric detector for instance, the output from a receiver receiving such signals can be fed directly to a microwave antenna, such as a horn, providing an optically driven microwave link.

Embodiments of the present invention also have the advantage that they can be fabricated to form only a small dimensioned package which is particularly convenient in certain environments.

According to the present invention, there is provided an optical communications system, comprising:

an optical signal source, said source having an optical output, modulation means to produce modulation in said optical output, the arrangement being such as to cause optical sidebands to appear in the optical output, and modifying means to modify a characteristic of the optical output so as to allow photodetection of at least one beat frequency between said sidebands at a receiver receiving said optical output.

In particular, said characteristic might be a phase or amplitude characteristic of the optical output. That is, it has been recognised that including modifying means which modifies the phase (or amplitude) of the FM or AM sidebands of the optical source effectively "uncancels" the beating between optical sidebands, thereby producing a received electrical signal with components at harmonics of the original modulating frequency.

As mentioned above, it has also been discovered that such harmonics can be modulated to carry information signals such as video signals, and the output from a detector, or at least from a receiver incorporating a detector, can be used to feed a microwave antenna directly, so that an optical fibre fed, information signal carrying microwave link is produced.

A convenient means for modifying phase characteristics of one or more of the sidebands comprises dispersive optical fibre. The different sidebands will be phase shifted so that the beat frequencies between them, the "harmonics" of the modulation frequency, can be picked up by the photodetector. For instance, if the laser source is driven with a 4 GHz FM signal and the output passed through 12.5 km of conventional step index fibre, phase shifted optical sidebands received at a detector will beat to produce a photo current comprising a frequency comb with 4 GHz spacing. In the detector, the frequency comb will produce harmonics significantly above 4 GHz, for instance at 40 GHz, as a result of beating between optical sidebands spaced by 10×4 GHz.

In a possible application, the output of the detector can then be fed to a microwave antenna and propagated as a radio frequency (RF) signal in free space thereby. The beat frequency (eg. 40 GHz) signal is then conventionally detected at a receiving microwave antenna, mixed to a local oscillator to downconvert to an intermediate frequency, amplified and fed to an intermediate frequency (IF) receiver.

Notably, in embodiments of the present invention where dispersive phase shifting is used to achieve harmonic detection at the photodetector, all the sidebands are contributing to the RF signal. This is in contrast to the 1985 disclosure of Goldberg et al, referenced above.

BRIEF DESCRIPTION OF THE DRAWINGS

Embodiments of the present invention will now be described, by way of example only, with reference to the accompanying figures, in which.

DETAILED DESCRIPTION OF EXEMPLARY EMBODIMENTS

Optical fibre and millimeter-wave radio are both capable of supporting large bandwidth requirements, for instance as associated with broad band services. Running optical fibre direct to a home or business can provide high capacity but is not always an appropriate solution for operational reasons. It is likely that a hybrid network comprising both radio and fibre will play a significant role in early broadband local access systems.

Radio transmission in the 60 GHz millimeter-wave region is of special interest because an oxygen absorption peak aids frequency re-use in a cellular communications environment. In addition, high gain antennae are physically small at this frequency and could be manufactured cheaply in volume for consumer applications. However, practical issues such as cost, size, weight, frequency stability and power consumption of radio outstations need to be addressed before hardware could be deployed to provide broadband services at millimeter-wave frequencies.

In both arrangements of the present invention described herein direct modulation is applied to a single mode semiconductor laser to create an optical FM signal. Dispersion in an optical fibre then perturbs the phase relationships between the FM side bands in such a way that the output from the photodetector provides significant power levels at high order harmonics of the modulation frequency. With a modulation frequency of 4 GHz, considerable power is obtained beyond the 15th harmonic, that is at frequencies in excess of 60 GHz. Unwanted harmonics could be removed easily if necessary by electrical filtering after photodetection.

It should also be noted that, because the optical FM side bands are derived from the same optical mode, the optical phase noise is cancelled at the photodetector. Therefore the phase noise is principally determined by that of the modulating source. The combination of efficient harmonic generation, high spectral purity, compact size, and the ability to choose any frequency (at least to 60 GHz) makes this a most attractive technique for the transmission of millimeter-wave radio signals over optical fibre.

Figure 1:
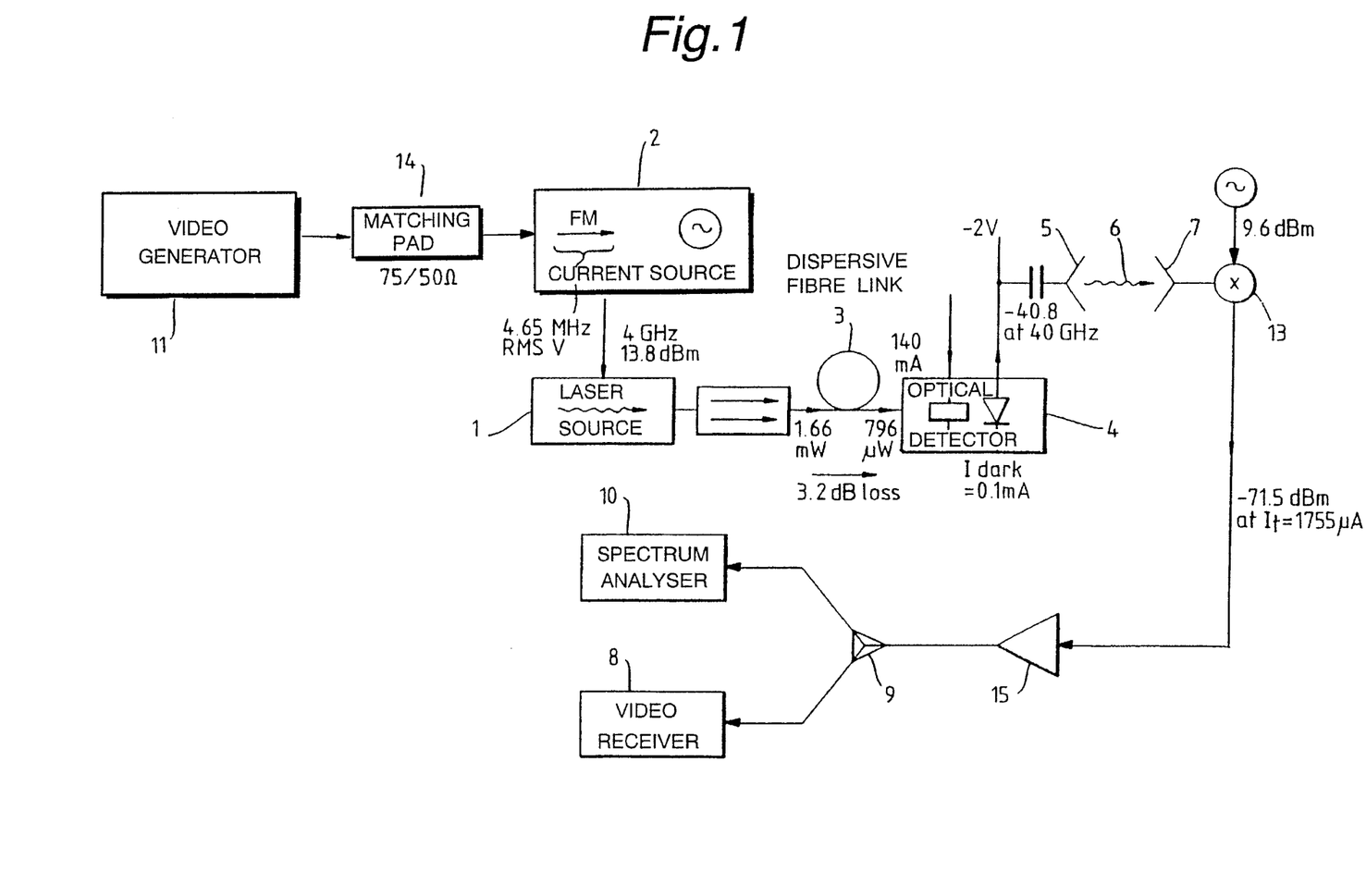
FIG. 1 shows a schematic diagram of a first arrangement of an optically fed microwave link carrying a video signal and comprising an optical signal source according to an embodiment of the present invention.

Referring to FIG. 1, the first arrangement of an optical fed microwave link of the present invention comprises a laser source 1, supplied with a drive current by a frequency modulated current source 2, the laser output being fed via a a dispersive fibre link 3 to an optical detector 4. A video signal is superimposed on the FM output of the current source 2 by a video pattern generator 11. The electrical output of the detector 4 is fed to a microwave transmitter 5 which generates a free space signal link 6 to a microwave receiver 7 whose electrical output is down converted, amplified and fed to a video receiver 8 according to known techniques.

The laser source 1 comprises a single mode DFB laser, being a bulk device with grating feedback. The optical detector 4 comprises a high gain, high speed detector as disclosed in International Patent Application number GB91/00702 WO, filed on 1st May 1991, priority date 1st May 1990, in the present Applicant's name. The fibre link 3 comprises 12.5 km of conventional step-index single-mode fibre.

If the laser source 1 is driven by a signal at 4 GHz, the signal received at the optical detector 4 from the dispersive fibre link 3 will contain optical sidebands, phase shifted to produce a photo current output from the detector 4 comprising a frequency comb with 4 GHz spacing. In the detector, the frequency comb will include a beat frequency at 40 GHz from signals at 10×4 GHz separation. That 40 GHz beat frequency can be filtered and fed directly to the microwave transmitter 5. At the receiver 7, the 40 GHz signal can be mixed and downconverted to an intermediate frequency using conventional techniques. The downconverted component may then be passed through an amplifier 15, split and fed to the video receiver 8, the other part of the signal output from the splitter 9 being used to supply a spectrum analyser 10 for monitoring purposes.

In the system described above, effectively the tenth harmonic of the 4 GHz modulating signal has been selected.

CONSTRAINTS AND OPERATING CHARACTERISTICS

There are a number of constraints and characteristics of the system described above and these are as follows.

Frequency Deviation

Referring still to FIG. 1, the video receiver 8 requires a FM input of approximately 13 MHz deviation. Using a synthesiser as the current source 2 to produce a 4 GHz frequency modulated drive current to the laser source 1, the video pattern generator 11 is used to modulate that 4 GHz "carrier". To achieve the 13 MHz deviation at the video receiver input, the frequency deviation at the output of the current source 2 should be approximately 1.3 MHz in view of the use of the tenth harmonic. The video pattern generator 11, having a nominal output of 1 v, is used to drive the FM input of the current source 2, or synthesiser, via a 75/50 Ohm matching pad 14.

4 GHz FM to 40 GHz AM Conversion Efficiency

Figure 2:
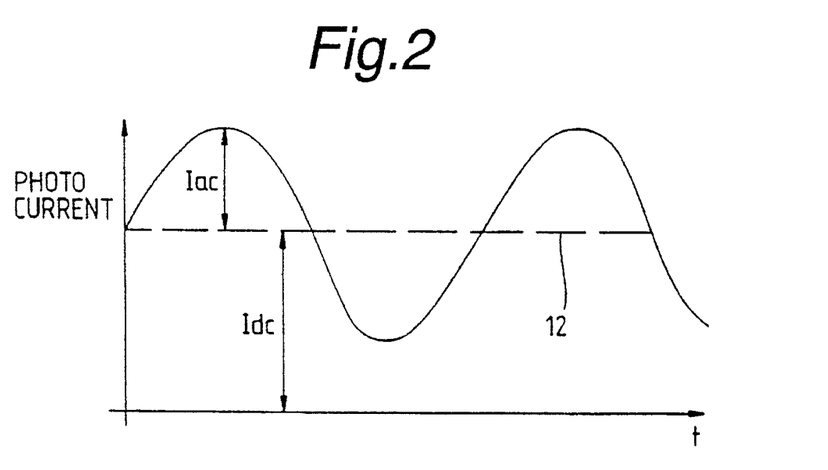
FIG. 2 shows a graph of modulation depth at the output of an optical detector, detecting the output of the optical source of FIG. 1 after optical phase shifting by transmission on a dispersive optical fibre.

Referring to FIG. 2, in selecting the tenth harmonic, there is a conversion at the optical detector 4 not only in frequency but also in signal type. That is, the 4 GHz optical FM signal transmitted by the laser source 1 becomes a 40 GHz electrical signal at the output of the optical detector 4.

In FIG. 2, the modulation depth "M" at the output of the optical detector 4 can be defined as the ratio of the amplitude of the harmonic $I_{ac}$ to the direct current photo current $I_{dc}$. This is seen in FIG. 2 as the peak height of the modulation $I_{ac}$ with respect to the base level 12 provided by the dc photo current $I_{dc}$.

The modulation depth can however be arrived at by a separate analysis, as follows.

The modulation depth, $M_p$, of the pth harmonic is given by $$M_p = 2J_p(2\beta \sin(p\theta))$$

where $J_p$ is the pth bessel function $\beta$ is the FM index of the laser and =Fdeviation/Fmodulation $\theta$ is an angle characterising the dispersion in the fibre.

The dispersion angle, $\theta$, is given by $$\theta = (2\pi F_{mod})^2 \times \left( -DZ\lambda \frac{\lambda}{4\pi c} \right) \quad 2$$

where $F_{mod}$ = laser modulation frequency
= 4GHz in the example

D = fibre dispersion in ps/km/nm
Z = fibre length
$\lambda$ = free space wavelength of light
c = speed of light.

According to equation 1, the maximum modulation depth of the pth harmonic equals twice the maximum value of the pth bessel function.

Figure 3:
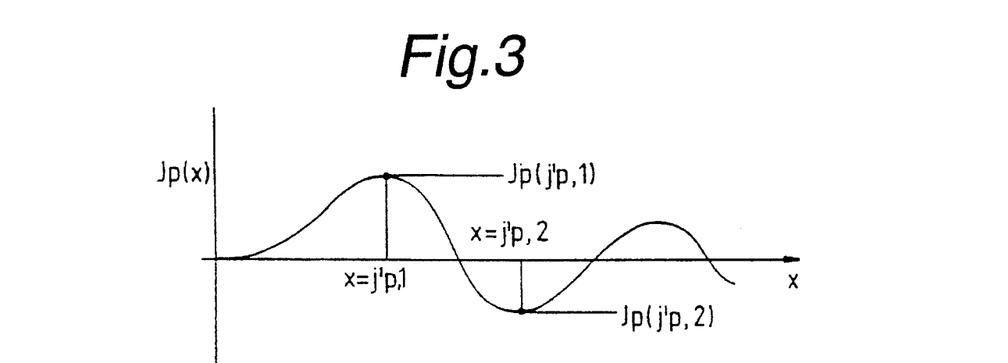
FIG. 3 shows in graphic form a definition of a Bessel function Jp for a variable x.

Referring to FIG. 3, values of the bessel function $J_p$ for a variable x can be defined as shown. Using this nomenclature, then the greatest modulation depth for the pth harmonic is given by $$M_p(\text{max}) = 2J_p(j'p, 1)$$

and occurs when $$2\beta \sin(p\theta) = j'p, 1$$

The values of p, (j'p, 1), & $J_p$(j'p, 1) are tabulated as follows:

| p  | j' p, 1  | Jp(j' p, 1) |
|----|----------|-------------|
| 0  | 0        | 1           |
| 1  | 1.84118  | .58187      |
| 2  | 3.05424  | .4865       |
| 3  | 4.20119  | .43439      |
| 4  | 5.31755  | .39965      |
| 5  | 6.41562  | .37409      |
| 6  | 7.50127  | .35414      |
| 7  | 8.57784  | .33793      |
| 8  | 9.64742  | .32438      |
| 9  | 10.71228 | .3128022    |
| 10 | 11.7717  | .3027425    |
| 11 | 12.82729 | .2938809    |
| 12 | 13.87962 | .285987     |
| 13 | 14.92913 | .2788889    |
| 14 | 15.97618 | .2724552    |
| 15 | 17.02105 | .2665838    |
| 1b | 18.06397 | .2611935    |
| 17 | 19.10516 | .2562191    |
| 18 | 20.14477 | .2516072    |
| 19 | 21.18294 | .2473137    |
| 20 | 22.21981 | .243302     |

Theoretically, using the tenth harmonic, the maximum modulation depth that could be achieved was 60%. However, in practice, significantly lower modulation depth might be achieved, for instance of the order of 13%.

It might be noted that $\beta$ gives an approximate threshold value for appearance of the "nth" harmonic at $\beta$ approximately equal to n/2.

Fibre Length and Dispersion

The dispersion, $\theta$, produced by the fibre link 3, has been set out above at equation 2. Putting in the following experimental values, a length of 12.5 km for the dispersive fibre link 3 was found to be adequate to give significant phase shifting between sidebands.

$F_{mod}$=4 GHz
D=17 ps/km/nm (dispersion)
z=12.5 km (length of fibre)
$\lambda$=1550 nm (optical signal wavelength)

This gives a value for $Dz\lambda$ of 329 nS. $\lambda/c$ is $5.17 \times 10^{-6}$ nS. Therefore, $\theta$, by substitution in equation 2, $=2\pi \times 2.72 \times 10^{-2}/2$.

$$p\theta = 10\theta = 2\pi \quad \times 0.272$$
$$= 0.27\pi$$

For the tenth harmonic, it is desired that $p\theta=0.5\pi$. However, from the above, we have $p\theta=0.27\pi$ This gives sin $(p\theta)=\sin (0.27\pi)=0.75$ The value of $p\theta=0.5\pi$ is optimum in the sense that this value minimises the modulating power that has to be applied to the laser in order to maximise the 40 GHz component. In the present experiment, z at 12.5 km represented about half the optimum length of fibre, but this can be compensated by an increase in the modulation index, $\beta$.

FM Deviation of Laser

Going back to equation 1, $M_p$ is maximum when $$2\beta \sin(p\theta) = j'p, 1$$
$$= 11.77 \text{ for } p = 10$$

This gives an estimated value of $\beta$ at approximately 7.8.

The laser drive power at 13.8 dBm, 24 mW gives a zero to peak current amplitude of 31 mA.

The FM deviation of the laser is given by Fdev=$\beta\times 4$ GHz=31.4 GHz, so the laser FM efficiency is given by $$\frac{\Delta F}{\Delta i} = 1\text{GHz/mA}$$

RF Propagation

Using a separation of 0.5 m between the microwave transmitter 5 and the receiver 7, the measured loss across the free space signal link 6 was 19.0 dB. Theoretically, with a path loss across the link 6 of 60 dB, and antenna gains at the microwave transmitter and receiver 5, 7 of 21.5 dB each, one would expect the net loss to be 17.0 dB. (It should be noted however that 0.5 m is not a distance clearly related to either the near or the far fields in these circumstances and the estimate at 17.0 Bb for the net loss can only be treated as approximate.

Down Conversion

Loss at the downconverter 13, the measured power loss from the 40 GHz signal from the microwave receiver 7 to the intermediate frequency signal output by the down-converter 13, was measured as 11.7 dB, using a 9.6 dBm 39 GHz input at the LO part of the down-converter 13.

Video FM Transfer

Figure 4:
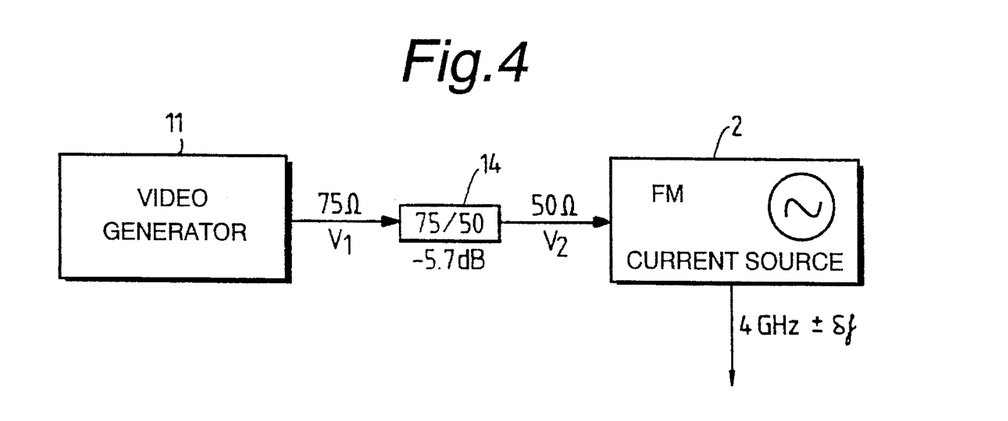
FIG. 4 shows in more detail the steps in providing a modulated drive current to a laser structure in an optical signal source as shown in FIG. 1.

Referring to FIG. 4, there is a voltage reduction $V_2/V_1$ due to the 75/50 Ohm matching pad 14 of 0.424, for a video output of $V_1$ at 1V. Using a synthesiser 2 set to give 4.65

MHz/RMS (Root Mean Square) Volt, the FM deviation "δf" per Volt at $V_2$ is given by $$\delta f/V_2 = (1/\sqrt{2}) \times 4.65$$

giving $$\delta f/V_1 = (1/\sqrt{2}) \times 4.65 \times 0.424$$
$$= 1.52 \text{MHz/V}.$$

The FM transfer coefficient was measured directly for the 4 GHz and 40 GHz components:

|  | $\Delta V_{pk\text{-}pk}$ | $\Delta f_{pk\text{-}pk}$ | $\Delta f/\Delta V$ |
|---|---|---|---|
| 4GHz | 1.0V | 1.38MHz | 1.38MHz/V |
| 40GHz | 150mV | 2.04MHz | 13.3MHz/V |

This gave a measured FM transfer coefficient at 40 GHz of 13.3 MHz/V compared with a calculated value of 15.2 MHz/V.

Other Factors

Looking at the threshold sensitivity of the video receiver 8, the calculated threshold sensitivity was found to be −86 dBm. The experimental threshold was found to be −85 dBm. No significant extra noise is introduced by the optical link but it is thought that the line amplifier 15 may have a small effect.

Concerning gain at the line amplifier 15 and the splitter 9, the combined gain was found to be 4 dB.

Power budget

Factors in the power budget at the microwave transmitter 5 are as follows:

| | | |
|---|---|---|
| Reference (0dBm optical power) | = | −14.1 |
| Optical input power (twice −1dBm) | = | −2.0 |
| Responsivity | = | +5.2 |
| Ideal modulation depth | = | −10.5 |
| FM/AM inefficiency | = | −7.0 |
| Detector roll off | = | −12.5 |
| 50 Ohm matching | = | 0.0 |
| Electric power | = | −40.9dBm |

Including the rest of the system, the power budget is then as follows:

| | | |
|---|---|---|
| | = | −40.9dBm |
| Path loss (0.5m) | = | −60.0dB |
| Transmitter horn gain | = | +21.5 |
| Receiver horn gain | = | +21.5 |
| Received power | = | −57.9dBm |
| Excess path loss | = | 1.9dBm |
| Net received power | = | −59.8dBm |
| Conversion loss | = | −11.7dB |
| Line amplifier/splitter | = | +4.0dB |
| Video received power | = | −67.5dm |
| Threshold power | = | −85.0dBm |
| Margin | = | 17.5dB |

It should be noted that, although a microwave horn is described at the microwave transmitter 5 and the microwave receiver 7, a horn is only one possible type of antenna which might be used in such a transmitter or receiver.

Possible improvements in the system described above might be to increase the microwave transmission range. In order to transmit 100 m, an extra 46 dB power approximately would be required such that the radio frequency transmitter gave out perhaps +6 dBm. In order to increase transmitter power, one might adjust the following:

Detector roll off optical input powers impedance matching

Feasibly, one could achieve −10 dBm transmitted power, for instance.

Figure 5:
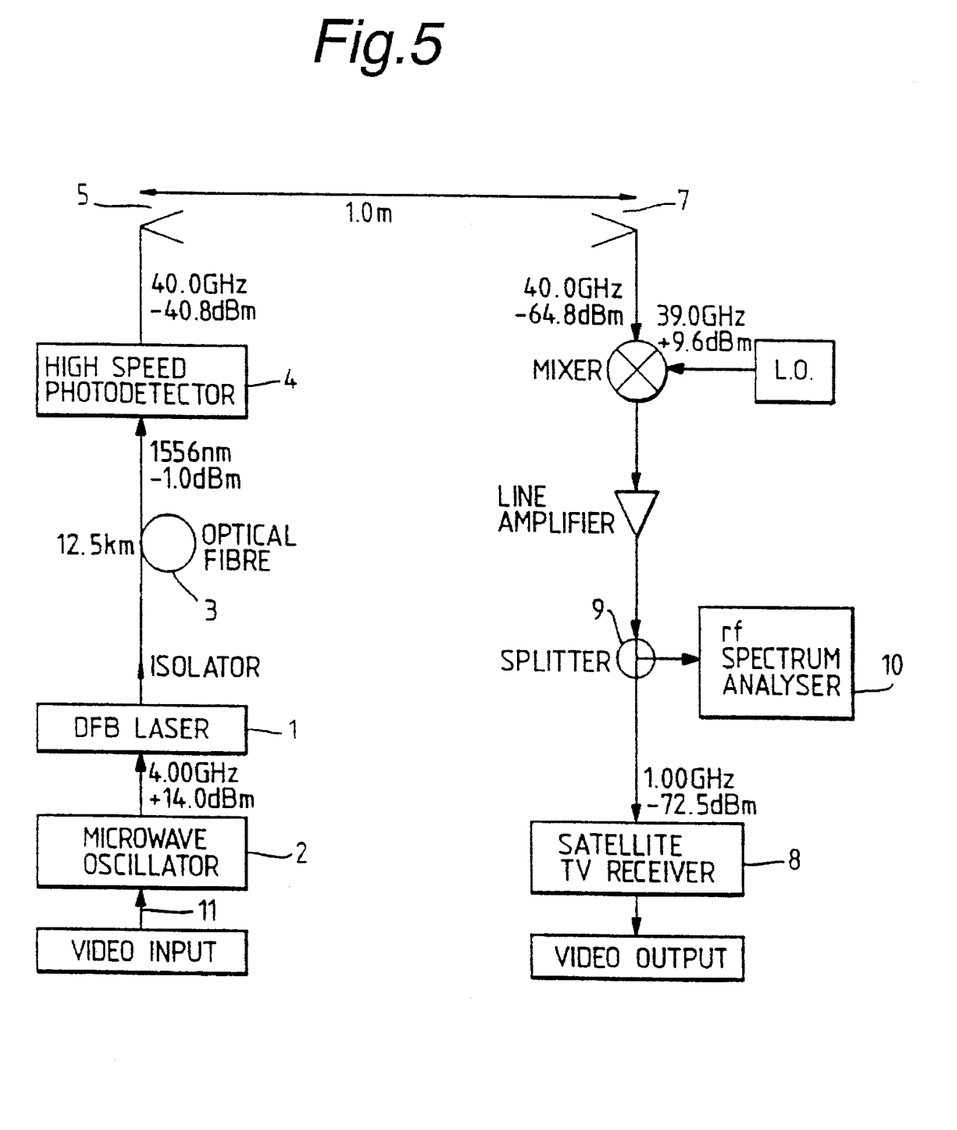
FIG. 5 shows a schematic diagram of a second arrangement of an optically fed microwave link carrying a video signal and comprising an optical signal source according to an embodiment of the present invention.

FIG. 5 shows a second experimental layout for an embodiment of the present invention.

A three contact DFB laser 1 is driven by a microwave oscillator 2 to crease an optical FM signal. The microwave oscillator 2 is itself frequency modulated by an input video signal 11. The resulting modulated lightwave is transmitted along 12.5 km of standard single mode fibre 3 and detected by a high speed photodetector 4 which in turn drives the radio transmitter antenna 5. At the radio receiver, the incoming signal is down converted to an intermediate frequency (IF) within the band of a satellite TV receiver 8 and then displayed on a video monitor or a spectrum analyzer 10.

The three contact DFB laser 1 comprises a device 350 μm long, the outer contacts of which are connected together. The outer contacts are biased at 90 mA while the centre contact is biased at 30 mA. Under these conditions, the output power (after optical isolation) was 1.6 mW at a wavelength of 1556 nm, and the FM efficiency (driving the centre contact) was 1.0 GHz/mA at the microwave oscillator frequency of 4 GHz. The oscillator power was set to a level of +14 dBm, which was found to maximise the magnitude of the tenth harmonic at 40 GHz (the highest frequency for which the radio receiver equipment was readily available).

The pigtailed high speed photodetector 4 was a monolithically integrated optical pre-amplifier and edge-coupled PIN photodiode, with a responsivity of 0.61 A/W at 40 GHz. A bias tee and a waveguide-to-coaxial transition were used to connect the photodiode directly to a standard gain (21.5 dB) horn antenna to form the radio transmitter. The optical power level after the 12.5 km of optical fibre was −1.0 dBm, which produced an electrical power of −40.8 dBm (at 40 GHz) at the photodiode output. The 40 GHz optical modulation depth at the photodiode was calculated from these values to be 12%. The 3 dB line width of the 40 GHz carrier (with the video input signal removed) was less than 10 Hz.

After transmission over 1 m of free space, the power at the output of the receiver horn 7 was −64.8 dBm. A local oscillator at 39 GHz was used to down convert to an IF of 1 GHz. The conversion loss was 11.7 dB and the IF power after the line amplifier and splitter 9 was −72.5 dBm.

The 4 GHz drive frequency to the laser 1 deviates in response to the video input signal connected to the FM input of the microwave source 2. The deviation is reflected in the frequency spacing of the optical FM side bands and the electrical comb at the output of the photodiode in the photodetector 4. Each frequency of the comb deviates in proportion to its harmonic number and the tenth harmonic at 40 GHz therefore deviates by ten times the deviation of the 4 GHz output of the microwave source 2. The peak FM deviation required by the video satellite receiver unit is approximately 14 MHz so the FM coefficient of the microwave source 2 was set to 1.4 MHz/V for the video input signal level of 1 Vpk.

The threshold power level of the video receiver was −85.0 dBm, giving a margin of 12.5 dB. The calculated FM threshold power level was −86 dBm, based on a bandwidth of 30 MHz, a signal-to-noise ratio of 8 dB, and a receiver noise figure of 5 dB. Close agreement between the experimental and calculated threshold power levels indicates that the noise contributed by the optical link can be ignored in this experimental arrangement.

In practice, a longer radio transmission distance may be necessary. There are a number of improvements which could be made in the arrangement described above. A possibility involves a modified source which would increase the modulation depth at the photodiode in the photodetector 4. It has been shown that the maximum modulation depth obtainable for a source with pure frequency modulation is 60% for the tenth harmonic, and that the discrepancy with the experimental value of 12% is caused by the presence of significant intensity modulation at the output of the laser 1.

Another possibility is improving the responsivity of the photodetector 4. Previous examples of this type of photodetector in a different package (without a fibre pigtail) have shown responsivity values of over 30A/W at 40 GHz. Although saturation of the integrated optical amplifier and the current handling capability of the photodiode will set a limit to available output power, a maximum photocurrent of more than 10 mA is not unreasonable. If this is combined with a modulation depth of 100%, a millimeter wave power level of more than +4 dBm would be available, which is greater than a 45 db increase over the experimental arrangement described above. Narrow band design and impedance matching at the output of the photodiode may result in further improvement.

Electrical amplification at the photodetector output is an obvious way to increase the radio range, but it may be preferred in practice that an outstationed radio transmitter be kept relatively simple. Improvements in this area might arise from a reduction in the number of components and also a reduction or elimination of their requirements for dc power.

For point to point applications, the use of directional antennae rather than standard gain horns could increase the received millimeter-wave power considerably, again leading to increased radio range. The 45 dB increase in power at the radio transmitter, coupled with 20–30 dB afforded by the use of directional antennae would lead to a total increase in received power of 65–75 dB, and therefore transmission distances greater than 1 km would be possible.

The experimental arrangement described above uses the tenth harmonic at 40 GHz. In principle, it would be possible to move to 60 GHz either by increasing the modulation frequency or by making use of 15th harmonic. Also the system described above only incorporates a single video channel. It may be that embodiments of the present invention would be suitable in multichannel transmission.

To sum up, the arrangement described above demonstrates a simple technique for realizing millimeter-wave radio-fibre systems which does not require either a millimeter-wave source at the optical transmitter 1, or up conversion at the radio transmitter 5. The technique is suitable for transmission of FM signals such as wide band video FM, or continuous wave (CW) signals for remote injection locking applications. The spectral purity of the CW millimeter-wave signal transmitted in this way is determined primarily by that of the microwave oscillator. For practical applications it would be necessary to increase the radio propagation range, but improvements in this area could make 1 km a realistic target.

Publications comprising subject matter relevant to the above are as follows:

I C Smith and B J Ellis: "A wide band mm-wave Fibre-fed Radio Distribution Point Demonstrator", ICC92 Conference Record pages 100–104, June 1992.

G Sherlock, H J Wickes, C A Hunter and N G Walker: "High Speed, High Efficiency, Tunable DFB Lasers for High Density WDM Applications", ECOC92, Paper Tu P1.1, September 1992.

D Wake: "A 1550 nm millimeter-wave Photodetector with a bandwidth-Efficiency Product of 2.4 THz", J Lightwave Technol., vol. 10 pages 908–912, July 1992.

Although the use of the technique for transmission of FM video information has been described, it should be noted that other methods of impressing information onto the transmitted beat signal are possible. For example, the output of the modulated laser, comprising the optical sidebands, can itself be transmitted through an optical intensity modulator to superimpose the information to be communicated. At the receiver, the electrical signal would then contain beat frequencies between the optical sidebands, each with the information impressed. Such an arrangement might be used, for example, to transmit multiple video channels.

It is important to note that, although the arrangement described above relies on the properties of semiconductor lasers in generating optical FM, other forms of modulation might be substituted, such as phase modulation.

Further, although dispersive fibre 3 is described, other means for modifying the relative characteristics of the sidebands might be used, such as a grating pair.

Although the embodiments described above comprise a laser source 1, this is not essential, it being within the ambit of the present invention that an optical source be remote and of any of a number of types, it being sufficient for the invention that sidebands of the modulation can be produced, and hence at least one beat frequency.

In a different embodiment of the present invention, the fifteenth harmonic of a 4 GHz signal may for instance be detected, giving a beat frequency of 60 GHz. An arrangement in which this is the case is described below, together with some further discussion of aspects of the invention.

As described above, a frequency or phase modulated optical signal becomes intensity modulated through dispersion in single-mode optical fibres. Theoretical results describing this effect are presented below, and supported by observation of 12% intensity modulation at the 60 GHz harmonic of a 4 GHz signal applied to a three-contact DFB laser.

Chromatic dispersion is known to cause a phase or frequency modulated optical signal to become intensity modulated as it propagates along a single-mode optical fibre [1]. This effect has been identified as causing a power penalty in digital transmission systems, and intermodulation products and noise in analogue systems [2,3]. The same mechanism also causes signal fading in AM systems [4].

With reference to this following embodiment, we further discuss how dispersion can be used to advantage to generate high frequency mm-wave signals from a source which is frequency or phase modulated at microwave rates. The principle is demonstrated by applying a 4 GHz drive current to a split contact DFB laser designed for frequency modulation and observing the 60 GHz, 15th harmonic component of the intensity variations at the output of 12.5 km of dispersive single mode fibre.

Theory

Before considering specifically the case of frequency or phase modulation, we first derive a formula for the harmonic content of the intensity variations of any periodically modulated signal mode optical signal propagated over dispersive fibre. The electric field at the transmitter can be written in the form $$e_r(t) = f(\omega t)\exp(jv_0 t) \quad (1a)$$

$$= \sum_{n=-\infty}^{\infty} F_n \exp(j(v_0 + n\omega)t) \quad (1b)$$

where $v_0$ is the optical angular frequency of the single mode source, $\omega$ is the modulating angular frequency and $f(\theta)$ is a periodic function with harmonic components $F_n$ given by $$f_n = \frac{1}{2\pi} \int_{-\pi}^{\pi} f(\theta)\exp(-jn\theta)d\theta \quad (2)$$

The fibre transfer characteristic can be written in the form $$H(v) = \exp(-jk(v)z) \quad (3)$$
$$= \exp(-j(k_0 + k_1(v-v_0) + 1/2 k_2(v-v_0)^2 + \ldots)z)$$

where $z$ is the fibre length. In the expansion of the propagation constant $k(n)$, the first two terms represent a fixed phase shift and propagation delay. We retain only the third term (putting $k=k_0=0$), and write $$H_0 = H(v_0+n\omega) = \exp(-jn^2\phi) \quad (4)$$

where $\phi = \frac{1}{2}\omega^2 k_2 z$ parameterises the fibre dispersion at the operating wavelength and modulation frequency. The fibre group delay, $\tau_g$ for light at frequency $v$ is given by $$\tau_g = z\frac{dk}{dv} = zk_2(v-v_0) \quad (5)$$

and allows $\phi$ to be related to the group velocity dispersion parameter, $D = (d\tau_g/d\lambda)/z$ (normally quoted in ps/(km nm)), as follows [2]

$$\phi = 1/2\omega^2 k_2 z = -\frac{\omega^2}{4\pi} \frac{D\lambda}{c} z \quad (6)$$

The instantaneous optical intensity received after propagation through the fibre is given by $$i(t) = |e_r(t)|^2 \quad (7)$$

$$= \left| \sum_{n=-\infty}^{\infty} F_n H_n \exp(j(v_0 + n\omega)t) \right|^2$$

$$= \sum_{p=-\infty}^{\infty} I_p \exp(jp\omega t)$$

where the $I_p$ are the harmonic components of the intensity variations, and can be evaluted by inserting (4) in (7). Expanding the square as a double sum and collecting terms gives $$I_P = \exp(jp^2\phi) \sum_{q=-\infty}^{\infty} F_{q-p}^* F_q \exp(-2jqp\phi) \quad (8a)$$

$$= \frac{1}{2\pi} \int_{-\pi}^{\pi} f^*(\theta + p\phi)f(\theta - p\phi)\exp(-jp\theta)d\theta \quad (8b)$$

where to obtain (8b), equation (2) along with its inverse has been used. It is worth noting that the relative phase shift, $2p\phi$ between $f$ and $f^z$ in (8b) is the difference in group delay corresponding to an optical frequency difference of $p\omega$, and that the pth component of the intensity fluctuations is equal to the pth component of the delayed product $f^z f$. This result assumes only that the modulation is periodic, and that the dispersion is 'linear' ($k_1=0, i>2$ in (3)).

Returning to the case of frequency or phase modulation, we put $$f(\theta) = \exp(j\beta \cos(\theta)) \quad (9)$$

where $\beta$ is the phase deviation, or the frequency modulation index. Inserting (9) into (8b) gives $$I_P = \frac{1}{2\pi} \int_{-\pi}^{\pi} \exp(j2\beta\sin(p\phi)\sin(\theta))\exp(-jp\theta)d\theta \quad (10)$$

$$= J_p(2\beta\sin(p\phi))$$

where $J_p(x)$ is the pth Bessel function of the first kind. Equation (10) can also be derived by expanding the FM signal directly in terms of its Fourier components and applying Graf's addition formula [5] to equation (8a). Finally, we note that, as $i(t)$ is real, $I_p = I_p^z$, so that (7) can be written $$i(t) = I_0 + \sum_{p=1}^{\infty} 2|I_p|\cos(p\omega t + \xi_p) \quad (11)$$

where $\Xi_p$ gives the phase of the pth harmonic. On account of (11), we define the intensity modulation depth, $M_p$ for the pth harmonic to be $$M_p = \left| \frac{2I_p}{I_0} \right| = |2J_p(2\beta\sin(p\phi))| \quad (12)$$

Equation (12) conveys the following conclusions. Firstly, the greatest modulation depth that can be obtained at the pth harmonic is equal to twice the greatest value of the corresponding Bessel function. These values fall off quite slowly with increasing p, and (12) predicts 60% modulation depth at the 10th harmonic. Secondly, the FM index required to achieve greatest intensity modulation depth is minimised if the fibre length is chosen such that $p\phi = (n+\frac{1}{2})\pi$, $n=0, 1, \ldots$. Otherwise the FM modulation index can be adjusted to compensate for non-optimum fibre length.

Experiment

The possibility of generating significant high frequency intensity modulation was investigated experimentally using a 300 μm long, three-section BH-DFB laser emitting at 1556 nm and designed for FM modulation, and 12.5 km of conventional step index single mode fibre. The detector was a monolithic pre-amplified edge coupled PIN photodiode with a responsivity (photocurrent/fibre power) of the 2 A/W at D.C. and 0.28 A/W at 60 GHz. The centre section of the laser was modulated at 4 GHz, and the output of the photodetector was monitored directly on a 40–60 GHz spectrum analyser, enabling the magnitudes of the 10th to 15th harmonics to be measured, and the corresponding intensity modulation depths to be calculated from knowledge of the photodiode response.

Figure 6A:
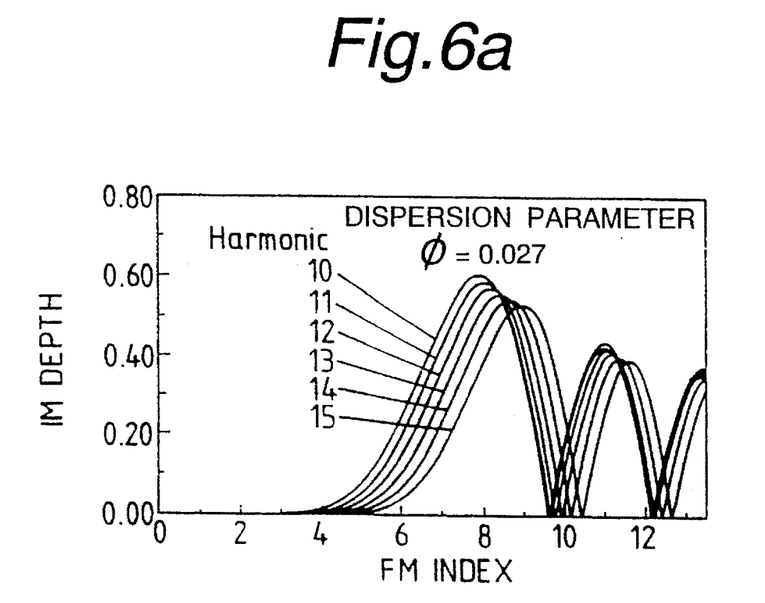
FIG. 6a) shows a graph of a theoretical relationship between modulation depth and FM modulation index for a range of beat frequencies, or harmonics 10 through 15 of a modulation signal.
Figure 6B:
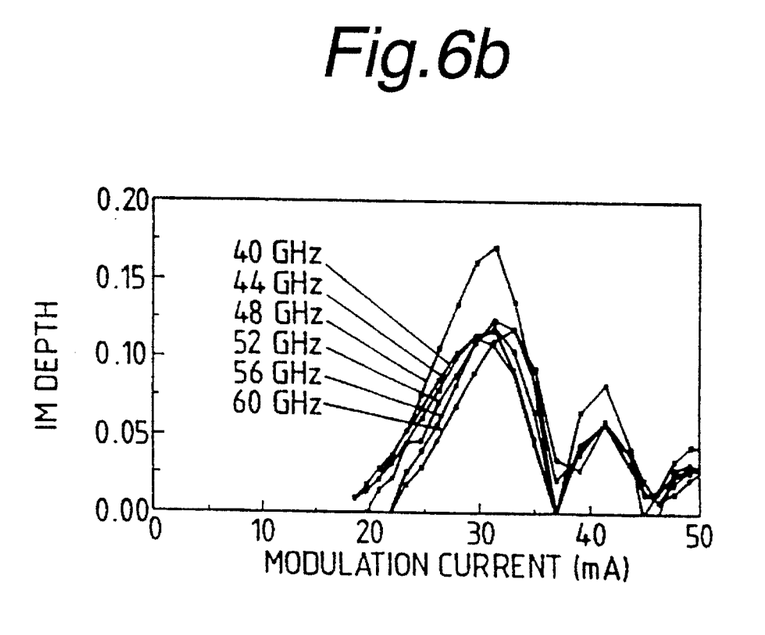
FIG. 6b) shows a graph of measured dependence of modulation depth on drive current to a laser structure for the harmonics of FIG. 6.

The theoretical modulation depth predicted by (12) is plotted as a function of FM modulation index in FIG. 6a. A fibre dispersion of D=17 pS/(km nm) has been assumed, giving a value of $\phi=0.027\pi$, which is about half the optimum for generating the 10th harmonic. The measured values of modulation depth are shown in FIG. 5b plotted as a function of the drive current applied to the laser, and it can be seen that these follow the form of the theoretical curves. The enhanced response of the 48 GHz component is thought to be due a resonance in the coupling circuit between the photodetector and RF spectrum analyser. The fact that the measured modulation depths are smaller than the theoretical values has been attributed to the non-ideal FM modulation of the laser. The output of the laser was itself significantly intensity modulated at the drive currents required to generate significant FM-IM conversion at the 10th–15th harmonics, and the effect of this has been modelled by an extension of the analysis presented above, and by a separate method.

Both approaches predict a reduction of the maximum intensity modulation depth of the harmonics, as well as a more pronounced rolloff with increasing FM index, as observed in the experimental plots.

By comparing the horizontal scales in FIGS. 6a and 6b, it can be inferred that the FM responsivity of the DFB laser is about 1.1 GHz/mA, and this value was confirmed by direct measurement of the spectral spreading of the modulated source on an optical spectrum analyser.

Conclusions

A frequency modulated or phase modulated optical signal becomes intensity modulated when propagating in dispersive fibre. Large modulation depth can be obtained at high harmonics of the modulating frequency, for example it is possible to generate 60% modulation depth of the 10th harmonic. The effect provides a method for generating mm-wave signals at frequencies for which baseband modulators are not available (40–100 GHz). The method is simpler to implement than, say, filtering and amplifying individual sidebands of a modulated laser, as it does not require careful alignment of optical wavelengths. Moreover, it is efficient in the sense that optical power is not wasted by rejecting unwanted sidebands. The FM index can be adjusted to accommodate variations in fibre length, and the generated frequencies can also be tuned easily. The technique could find application in the transmission of high frequency radio signals over optical fibres.

References

[1] A. R. Chraplyvy, R. W. Tkach, L. L. Buhl, R. C. Alferness, 'Phase modulation to amplitude modulation conversion of CW laser light in optical fibres', Electron. Lett. 1986, 22(8), pp. 409–411.

[2] G. Meslener, 'Chromatic Dispersion Induced Distortion of Modulated Monochromic Light Employing Direct Detection', IEE Jnl Quantum Electron., 1984, QE-20(10), pp1208–16.

[3] J. Wang, K. Petermann, 'FM-AM conversion effects in dispersive optical fibre lines with respect to analogue and digital systems', Proc 17th ECOC, 9/12 Sept, Paris, Paper WeC8-5, Vol 1, pp573–6.

[4] P. A. Rosher, M. K. Compton, A. D. Georgiou, 'Dispersive considerations in microwave optical systems', Prod IEE Colloquium 'Microwave Optoelectronics', 26th Oct. 1990, IEE digest 1990/139, pp12.1–12.6.

[5] M. Abramowitz, I. Stegun Eds. 'Handbook of mathematical functions', Dover Publications, New York, ISBN 486-61272-4.

I claim:

1. An optical communications system comprising:
   an optical signal source, said source having an optical output,
   modulation means to produce angle modulation in said optical output at a modulation frequency causing optical sidebands to appear in the optical output,
   modifying means to modify a relative characteristic of the optical sidebands in the optical output and allow photodetection of at least one harmonic of said modulation frequency at a receiver receiving said optical output, and
   a receiver for receiving and photodetecting said optical output to produce at least one harmonic of said modulation frequency.

2. A system as in claim 1, wherein said modulation means produces phase modulation in said optical output.

3. A system as in claim 1, wherein said modulation means produces frequency modulation in said output.

4. A system as in claim 1, wherein said relative characteristic is relative phase.

5. A system as in claim 4, wherein said phase modifying means comprises a dispersive element.

6. A system as in claim 1, further comprising a microwave antenna which in use receives the said at least one harmonic of said modulation frequency subsequent to photodetection by the receiver.

7. An optical signal source for use in a communications system, said source having:
   an optical output,
   modulation means to produce angle modulation in said optical output to cause optical sidebands to appear in the optical output, and
   modifying means comprises a length of optical fibre to modify the relative phases of the optical sidebands in the optical output to allow photodetection of at least one beat frequency between said sidebands at a receiver receiving said optical output.

8. A source as in claim 7, the source comprising a semiconductor laser structure.

9. A source as in claim 8, wherein said laser structure comprises a laser suitable for direct frequency modulation.

10. A source as in claim 8, wherein said laser structure comprises a continuous wave laser and said modulation means comprises a phase modulator.

11. A method of generating a radio frequency signal comprising:
   (i) driving a semiconductor optical source at a drive current sufficient to generate an optical output;
   (ii) angle modulating said optical output at a modulation frequency to generate optical sidebands in the optical output;
   (iii) modifying a relative characteristic of said optical sidebands in the optical output; and
   (iv) photodetecting said optical output to produce an electrical signal which comprises at least one harmonic of said modulation frequency.

12. A method as in claim 11, wherein said relative characteristic in relative phase.

13. A method of generating a free space microwave communications signal comprising the steps i) to iv) according to claim 11, and further step of:
   v) feeding a harmonic of said modulation frequency included in said electrical signal to a microwave antenna.

14. A system as in claim 5, wherein the dispersive element comprises a length of optical fibre.

15. A method as in claim 12, wherein step (iii) comprises conducting said optical output through a length of dispersive optical fibre.

16. A system as in claim 1, wherein said modulation frequency is a modulated carrier frequency.

17. A method as in claim 11, wherein said modulation frequency is a modulated carrier frequency.

18. A method of generating a radio frequency signal comprising:
   (i) driving a semiconductor optical source at a drive current sufficient to generate an optical output;
   (ii) angle modulating said optical output to generate optical sidebands in the optical output;

(iii) conducting the optical output through a length of dispersive optical fibre to modify the relative phases of the optical sidebands in the optical output; and (iv) photodetecting said optical output after its conduction through the optical fibre to produce an electrical signal which comprises at least one beat frequency between said sidebands.

19. A method of generating a free space microwave communications signal comprising the steps (i) to (iv) according to claim 18 and the further step of (v) feeding a said beat frequency included in said electrical signal to a microwave antenna.

20. A method of generating a radio frequency signal above 20 GHz for use in a wideband communications system, said method comprising the steps of:

(i) angle modulating a coherent optical signal to generate optical sidebands thereto;

(ii) passing said modulated optical signal through an optically dispersive optical signal processing component to modify the relative phases of optical signals in said optical sidebands;

(iii) photodetecting the optically dispersed optical signal output of step (ii) to produce an electrical signal including multiple harmonic frequency components and heterodyned beat frequency components therebetween; and (iv) selectively passing at least one of said electrical beat frequency signals for use as said radio frequency signal above 20 GHz.

* * * * *